3,265,671
SULFIDE-CONTAINING POLYMERS WHICH ARE CURED WITH LITHIUM CYANOBOROHYDRIDE
John E. Mahan and William M. Hutchinson, Bartlesville, Okla., assignors to Phillips Petroleum Company, a corporation of Delaware
No Drawing. Filed June 14, 1961, Ser. No. 116,974
10 Claims. (Cl. 260—79.5)

This invention relates to cured sulfide-containing organic polymers and propellants containing the same.

Polymeric unsaturated thioethers of relatively low molecular weight, and consequently liquid, would in many respects be well suited as a starting material for making rubbery articles, rocket propellants, etc. The presence of the sulfur confers good flexibility and elasticity at very low temperatures. The molecule is inherently stable and inert under storage conditions. Unfortunately, heretofore a suitable curing agent has not been available for these compositions, that is, one which will cure rapidly and controllably, and one which will not impair the desirable properties of the cured product.

The following are objects of our invention. An object of our invention is to provide a new method of curing sulfide-containing organic polymers. A further object of our invention is to provide these new cured polymers. A further object of our invention is to provide rocket propellants utilizing the cured sulfide-containing polymer as a binder.

Broadly, our invention resides in a process comprising mixing lithium cyanoborohydride with the reaction product of an aliphatic mercaptan and a polymer having a viscosity of at least 200 poises, at 25° C. selected from the group consisting of homopolymers of conjugated dienes of 4 to 12 carbon atoms and copolymers of said conjugated dienes and copolymerizable monomers containing the $CH_2=C<$ group and heating the resulting mixture to cure the same.

In another aspect, the invention resides in the reaction product of (1) lithium cyanoborohydride and (2) the reaction product of an aliphatic mercaptan and a polymer having a viscosity of at least 200 poises at 25° C. selected from the group consisting of homopolymers of conjugated dienes of 4 to 12 carbon atoms and copolymers of said conjugated dienes and hydrocarbon copolymerizable monomers containing the $CH_2=C<$ group.

In yet another aspect, the invention resides in a propellant composition comprising a binder, said binder being the reaction product of (1) lithium cyanoborohydride and (2) the reaction product of an aliphatic mercaptan and a polymer having a viscosity of at least 200 poises at 25° C. selected from the group consisting of homopolymers of conjugated dienes of 4 to 12 carbon atoms and copolymers of said conjugated dienes and copolymerizable monomers containing the $CH_2=C<$ group and, per 100 parts by weight of said binder, 0 to 60 parts of a filler, 0 to 20 parts of a plasticizer, 100 to 900 parts of a solid inorganic oxidizing salt, 0 to 3 parts of an antioxidant, 0 to 200 parts of a powdered metal, 0 to 200 parts of a metal hydride, and 0 to 5 parts of a burning rate catalyst.

This invention is based on the discovery that liquid and solid polymers prepared by reacting diene polymers and a mercaptan can be readily cured with lithium cyanoborohydride, generally as an ethereate or dioxanate, to a tough, rubbery material.

The polymers which can be cured by this system are homopolymers of conjugated dienes containing 4 to 12 carbon atoms and copolymers of these conjugated dienes with copolymerizable monomers containing the $CH_2=C<$ group. The polymers can be prepared by mass or emulsion polymerization processes, such processes being well known in the art. The polymers can be liquid having a viscosity of at least 200 poises at 25° C. or can be solids having a Mooney viscosity as high as 200 ML–4 at 100° C.

Examples of suitable conjugated dienes are 1,3-butadiene, isoprene, piperylene, methylpentadiene, 2-ethyl-1,3-butadiene, phenylbutadiene, 3,4-dimethyl-1,3-hexadiene, and 4,4-diethyl-1,3-octadiene.

Hydrocarbon materials which are copolymerizable with conjugated dienes include styrene, alpha-methylstyrene, various alkyl-substituted styrenes, and vinylnaphthalene.

In order to improve the low temperature properties, the polymer is reacted, prior to curing, with an aliphatic marcaptan containing from 1 to 16 carbon atoms. Preferably aliphatic mercaptans containing from 1 to 8 carbon atoms are used. Examples of suitable mercaptans are methyl mercaptan, ethyl mercaptan, isopropyl mercaptan, butyl mercaptan, 2-methyl-3-mercapto pentane, 1-mercapto-n-octane, 1-mercapto-2,2-dimethylpropane, sec-dodecyl mercaptan, 1-mercapto-2-methyl pentane, 2-mercapto-methyl pentane, etc.

The reaction between the polymer and the mercaptan has been frequently reported in the literature. It can be readily effected by adding the mercaptan to the polymerization system following the emulsion polymerization of the monomer mixture. In some instances irradiating the mixture with ultra-violet light hastens the reaction. The reaction can be initiated with oxygen or other oxidants such as peroxides or persulfates. The reaction should be continued until at least 10 percent of the double bonds of the polymer molecules are reacted with the mercaptan. Generally, the product should contain 3 to 15 weight percent of thioether sulfur.

The curing agent of my invention is lithium cyanoborohydride. This is commonly associated with one to four atoms of ether oxygen, preferably as the dioxanate. For example each mol of lithium cyanoborohydride will be associated with one-half to two mols of dioxane. The lower range of ether concentration is preferred. The pure material free of any ether (or dioxane) can be used.

The lithium cyanoborohydride is prepared by heating to approximately 100° C. a solution of lithium borohydride and excess hydrogen cyanide in the appropriate ether. A pressure of approximately 500 p.s.i. is required to maintain the system in the liquid phase.

$$LiBH_4 + HCN \xrightarrow{\text{ether}} LiB(CN)H_3 + H_2$$

The lithium cyanoborohydride is described in the following references: Gaylord, "Reduction With Complex Hydrides," Interscience, 1956, page 37. Wittig, G. and Roff, P. Annalen 573, pages 195–209 (1951).

In general, the polymer, whether liquid or rubbery, is thoroughly mixed with the curative at room temperature, in the first case simply by stirring, and in the second, by means of a roll mill, sigma blade mixer, or similar equipment. Where it is desired to extend the curing time in order to facilitate processing, for transportation of batches, etc., the curative may be mixed with a small portion of the reaction product of a mercaptan and a liquid diene polymer, the reaction product being rich in thio ether or ether groups. The mixture is heated to drive off ether or dioxane from the curative, and the resulting product pulverized. The curative in this modified form is less available, and the cure reaction will therefore be slower. This modified curative is dispersed in the polymer to be cured. After heat treatment or long standing, cure is effected by equilibration of $LiBH_3CN$ among the thio-ether groups.

The mixture is then molded and adjusted to the curing temperature and maintained there until cure is complete. Broadly, this temperature range is 0° C. to 200° C. with corresponding cure times of 24 hours to 5 seconds for the unmodified curing agent. A preferred range is 30° C. to 100° C., with corresponding cure times of 3 hours to one minute. At temperatures lower than the boiling point of dioxane, and at borderline curative and thio-ether concentrations, the ether must be previously driven off, or cure must be effected in vacuo.

The amount of lithium cyanoborohydride curing agent employed will vary with the nature of the polymer being cured, and the kind of properties desired in the final product. For a liquid polymer the curing agent will be in the range of 3 to 15 parts by weight per hundred parts of polymer, and preferably in the stoichiometric range based upon 3 to 15 weight percent of thioether sulfur.

Liquid polymers are defined as those having a viscosity in the range of 200 poises at 25° C. to 1 ML–4 at 100° C.; rubbery polymers are defined as those having a viscosity in the range of 1 to 200 ML–4 at 100° C.

For a rubbery polymer, the curing agent will be in the range of 1 to 10 parts by weight per hundred parts of polymer, and preferably in the stoichiometric range based upon 3 to 15 percent of thioether sulfur. Generally, less curing agent is required with rubbery polymers than with liquid polymers in order to obtain cured products with comparable characteristics. Any unreacted mercaptan sulfur in the composition desirably should be limited to one-tenth that of the thioether sulfur present.

In this type of curing system, coordinate bonds are formed between the boron of curing agent and the sulfur of the polymer, the sulfur being monofunctional and the boron being difunctional. This cure system therefore differs from the usual systems wherein the curing agent cross-links the polymer molecules through the carbon to carbon double bonds. Low sulfur content will limit the cure obtainable. Therefore, in order to obtain rubbery cured products from liquid polymers, it is recommended that at least 10 percent of the double bonds be substituted with mercaptan, so that sufficient sulfur atoms be present in the molecule.

An advantage of this curing system is its almost instantaneous cure. Cure occurs as fast as the dioxane is pumped off in case of very low molecular weight polymers. With higher polymers cure occurs on mixing. This fast cure can be used for quick casting or layup of films or masses merely by mixing polymer and curvative or by allowing diffusion to commingle them. Another advantage of the system is its stability to temperature and oxidation. This system makes excellent sealants for building construction, etc.

We have also discovered that the reaction product of the mercaptan and diene polymer, as described above, forms a good binder for the solid inorganic oxidizing salt in the preparation of propellants and that the binder can be readily cured with lithium cyanoborohydride. Generally the liquid polymers are most suitable for this use although solid polymer can be used. The propellants cure to strong, stable compositions with suitable combustion properties.

The solid propellants of this aspect of the invention can contain, an addition to the binder, fuel, a powdered metal or hydride of such metal, and various compounding ingredients commonly employed in making composite propellants such as plasticizers, antioxidants, reinforcing agents, wetting agents, modifiers, burning rate catalysts, and the like. The propellant composition can be formed into a grain having any desired shape or geometry, such as grains of the internal, external, and internal-external burning types. These grains can be cast or extruded, and can be restricted with any suitable restricting material, such as rubber.

The powdered metal or hydride can be, for example, aluminum, boron, magnesium, beryllium, and the like. Alloys can also be used, such as the aluminum alloys of boron, magnesium, manganese, copper, etc. Silicon can also be utilized, and the term "metal" is used herein to include silicon.

Generally, the components of the solid propellant compositions of this invention are present in the following amounts based upon 100 parts by weight of the polymeric binder:

| | |
|---|---|
| Filler | 0–60 |
| Plasticizer | 0–20 |
| Solid inorganic oxidizing salt | 100–900 |
| Antioxidant | 0–3 |
| Powdered metal | 0–200 |
| Metal hydride | 0–200 |
| Burning rate catalyst | 0–5 |

Useful inorganic oxidizing salts include the ammonium, alkali metal, and alkaline earth metal salts of nitric and perchloric acids and mixtures thereof, such as sodium perchlorate, potassium perchlorate, magnesium perchlorate, ammonium perchlorate, lithium perchlorate, potassium nitrate, sodium nitrate, ammonium nitrate, etc.

Various types of compounding ingredients, including fillers such as carbon black and mineral fillers can be incorporated in the polymer prior to reaction of the polymer with the lithium cyanoborohydride. Where it is desired to control closely the burning rate of the propellant composition, suitable burning rate catalysts can be incorporated therein. These catalysts include materials such as ferrocyanides sold under various trade names, such as Prussian Blue, Steel Blue, Bronze Blue, Turnbull's Blue, Chinese Blue, New Blue, Antwerp Blue, Mineral Blue, Paris Blue, Berlin Blue, Hamburg Blue, Williamson Blue, etc. Other useful burning rate catalysts include copper chromite, ammonium dichromate, potassium dichromate, sodium dichromate, etc.

In general, any rubber plasticizers which are hydrocarbons can be employed in these binder compositions when the binder is a rubber. Materials such as Pentaryl A (amylbiphenyl), Paraflux (saturated polymerized hydrocarbon), and Circosol–2XH (petroleum hydrocarbon softener having a specific gravity of 0.940 and a Saybolt Universal viscosity of 100° F. of about 2000 seconds), are suitable plasticizers.

Antioxidants include hindered phenols such as 2,2-methylene-bis(4-methyl-6-tert-butylphenol), and the like. Rubber antioxidants can be omitted.

It is to be understood that each of the various types of compounding ingredients may be used singly or mixtures of various ingredients performing a certain function may be employed. It is sometimes preferred, for example, to use mixtures of plasticizers rather than a single material.

The following examples illustrate our invention:

*Example I*

A liquid emulsion polymerized polybutadiene was reacted with butyl mercaptan to give a viscous product containing 1.6 weight percent sulfur. One part by weight of this polymer was mixed with an equivalent weight (0.025 part by weight) of $LiBH_3(CN) \cdot \frac{1}{2}$ dioxane. Some evidence of cure, a stiffening of the polymer, was observed during the mixing operation. The mixture was then placed in a vacuum oven at 65° C. After 30 minutes it had set to a soft gel that did not change with further heating under vacuum. The low state of the cure obtained was due to the low molecular weight and low sulfide content. It is thus evident that the cure obtained with this borohydride material is through the sulfide atom in the polymer molecule.

When the run is repeated with a polymer having a sulfur content of 10 weight percent, a moderately stiff rubber is obtained.

*Example II*

A polybutadiene made in an emulsion system having 25 ML-4 Mooney viscosity at 100° C. is reacted with butyl mercaptan in aqueous emulsion using potassium persulfate as the catalyst to produce a final dried mercaptan-free polymer having a 35 ML-4 Mooney viscosity at 100° C. and 6.4 weight percent sulfur as butyl thioether. It is mixed with 3.5 phr. lithium cyanoborohydride semidioxanate on a four-roll calender having a mean residence time of 6–10 seconds and operating at a final temperature of 250° F. The issuing sheet is heated under heat lamps for a duration of 30 seconds to 350° F., cooled in an air blast, dusted, and cut to size. The rubber sheet has an average tensile of 600 p.s.i. and elongation of 250 percent. The sheet is stable to 400° F. up to at least six hours in air.

*Example III*

A polybutadiene containing 40 percent trans, 50 percent cis and 10 percent vinyl unsaturation and having a viscosity of 250 poises at 25° C. is irradiated with ultraviolet light at room temperature in the presence of methyl mercaptan until the mercaptan free sulfur content is 3.7 weight percent. The viscosity is then 300 poises at 25° C. and 80 poises at 70° C. This polymer containing methyl thioether side chains yields a rubbery material when cured with 5.4 phr. lithium cyanoborohydride sesquidioxanate and functions as a binder system compatible with reactive metal hydrides and oxidizers such as ammonium perchlorate.

A propellant consisting of the following composition:

| | Parts |
|---|---|
| Binder (above polymer and curative level) | 16 |
| Lithium aluminum hydride, pure macrocrystalline (10–50 micron size) | 20.0 |
| Purified ammonium perchlorate bimodal (80/20 300 micron average size/28 micron average size) | 64.0 | is mixed in a sigma blade mixer with 0.050 in. clearances and provided with a cover under which argon is circulated. Order of addition and time of mixing: liquid polymer, lithium aluminum hydride (15 minutes), ammonium perchlorate (15 minutes), and the curative mixture (5 minutes). The curative mixture consists of one part lithium cyanoborohydride semi-dioxanate and one part of the polymer heated on a hot plate at 100° C. and 5 mm. Hg for three hours to displace the dioxane, and then broken into about ⅛-inch pieces. The mix is held at 70° C. in the mixer, cast under argon into molds at this temperature, vibrated, and cured at 60° C. for one day (during which time the curative dissolves and diffuses into the mass of the polymer and cures it).

The propellant properties are as follows:

| | |
|---|---|
| Density | 0.052 lb./cu. in. |
| Burning rate | 0.15 in./sec. at 1000 p.s.i. |
| Pressure exponent | 0.25 (600–1200 p.s.i.). |
| Tensile strength | 60 p.s.i. at 20° C. (in 12 seconds). |
| Elongation | 20 percent at 20° C. (in 12 seconds). |
| Elastic modulus | 400 p.s.i. at 20° C. and 1 in./in. min. |
| Stiffening temperature | −65° C. |
| Specific impulse | 270 lbs. f.-sec./lb. w. |

Reactive with moisture, stable in absence of moisture.

The curing system employed in this invention gives a controllable cure over a wide range of cure times and other conditions, and with the binder compositions employed, propellants of good physical and burning properties are obtained, and which are stable and inert under storage conditions.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

Th percent of the total unsaturation present as trans-1,4- is calculated according to the following equation and consistent units $\epsilon = E/tc$, where:

$\epsilon$ = extinction coefficient (liter - mols$^{-1}$-microns$^{-1}$);
$E$ = extinction (log $I_0/I$); $t$ = path length (microns); and
$c$ = concentration (mols double bond/liter). The extinction is determined at the 10.35 micron band and the extinction coefficient used is $1.21 \times 10^{-2}$ (liters=mols$^{-1}$=microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis-1,4- is obtained by subtracting the trans 1,4- and 1,2- (vinyl) determined according to the above methods from the theoretical unsaturation assuming one double bond per each $C_4$ unit in the polymer.

As many possible embodiments can be made of this invention without departing from the scope thereof, it is to be understood that all matter herein set forth is to be interpreted as illustrative and not as unduly limiting the invention.

We claim:

1. A process comprising mixing lithium cyanoborohydride with the reaction product of an aliphatic mercaptan and a polymer having a viscosity of at least 200 poises at 25° C. selected from the group consisting of homopolymers of conjugated dienes of 4–12 carbon atoms and copolymers of said conjugated dienes and copolymerizable hydrocarbon monomers containing the $CH^2=C<$ group and heating the resulting mixture to cure the same.

2. A process comprising mixing lithium cyanoborohydride with the reaction product of butyl mercaptan and liquid polybutadiene and heating the resulting mixture to cure the same.

3. A process comprising mixing lithium cyanoborohydride with the reaction product of butyl mercaptan and rubbery polybutadiene and heating the mixture to cure the same.

4. A process comprising mixing lithium cyanoborohydride with the reaction product of methyl mercaptan and liquid polybutadiene and heating the resulting mixture to cure the same.

5. A process comprising mixing lithium cyanoborohydride with the reaction product of methyl mercaptan and rubbery polybutadiene and heating the mixture to cure the same.

6. The reaction product of (1) lithium cyanoborohydride reacted with (2) the reaction product of an aliphatic mercaptan and a polymer having a viscosity of at least 200 poises at 25° C. selected from the group consisting of homopolymers of conjugated dienes of 4 to 12 carbon atoms and copolymers of said conjugated dienes and copolymerizable hydrocarbon monomers containing the $CH_2=C<$ group.

7. The reaction product of lithium cyanoborohydride reacted with the reaction product of butyl mercaptan and liquid polybutadiene.

8. The reaction product of lithium cyanoborohydride reacted with the reaction product of butyl mercaptan and rubbery polybutadiene.

9. The reaction product of lithium cyanoborohydride reacted with the reaction product of methyl mercaptan and liquid polybutadiene.

10. The reaction product of lithium cyanoborohydride reacted with the reaction product of methyl mercaptan and rubbery polybutadiene.

References Cited by the Examiner
UNITED STATES PATENTS

| | | | |
|---|---|---|---|
| 1,062,973 | 5/1913 | Holt | 260—94.4 |
| 2,665,272 | 1/1954 | Reynolds et al. | 260—94.4 |
| 2,988,435 | 6/1961 | Stanley et al. | 149—19 |
| 2,995,429 | 8/1961 | Williams et al. | 149—19 |

JOSEPH L. SCHOFER, *Primary Examiner.*

OSCAR R. VERTIZ, LEON D. ROSDOL, *Examiners.*

J. W. WHISLER, B. R. PADGETT, M. P. HENDRICKSON, *Assistant Examiners.*